(12) United States Patent
Kowalchyk et al.

(10) Patent No.: US 8,180,705 B2
(45) Date of Patent: May 15, 2012

(54) METHOD AND APPARATUS FOR INITIATING A FUNDS TRANSFER USING A MOBILE DEVICE

(75) Inventors: Eric F. Kowalchyk, Belmont, CA (US); William A. Detterman, Westlake Village, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 12/112,483

(22) Filed: Apr. 30, 2008

(65) Prior Publication Data
US 2010/0174647 A1 Jul. 8, 2010

(51) Int. Cl.
*G06Q 40/00* (2012.01)
(52) U.S. Cl. .................. 705/39; 705/35; 705/40
(58) Field of Classification Search .......... 705/39, 705/40, 30, 35, 42; 455/466; 235/379
See application file for complete search history.

(56) References Cited

U.S. PATENT DOCUMENTS

| | | | |
|---|---|---|---|
| 2002/0174069 A1* | 11/2002 | LaBadie et al. | 705/40 |
| 2003/0125054 A1* | 7/2003 | Garcia | 455/466 |
| 2006/0041506 A1* | 2/2006 | Mason et al. | 705/42 |
| 2007/0255653 A1* | 11/2007 | Tumminaro et al. | 705/39 |
| 2008/0046362 A1* | 2/2008 | Easterly | 705/40 |
| 2008/0140552 A1* | 6/2008 | Blaikie | 705/35 |
| 2009/0173781 A1* | 7/2009 | Ramachandran | 235/379 |
| 2009/0177562 A1* | 7/2009 | Peace et al. | 705/30 |

* cited by examiner

*Primary Examiner* — Samica L Norman
(74) *Attorney, Agent, or Firm* — Osha • Liang LLP

(57) ABSTRACT

The invention is directed to a method and apparatus for initiating an electronic funds transfer. The system includes a first mobile device, a payment engine, and a payment repository. The first mobile device includes functionality to display a notification of a sales transaction, obtain an authorization from the consumer to the electronic funds transfer based on the notification, instantiate a transfer entry form to obtain a transfer entry package, where the transfer entry package comprises the notification, a verification of the authorization, and consumer financial account information. The payment engine is operatively connected to the first mobile device and includes functionality to transmit the notification to the consumer of a sales transaction, generate the transfer entry form based on the authorization, and transmit the transfer entry package to a depository financial institution. The payment repository is operatively connected to the payment engine and includes functionality to store a record of the transfer entry package and the authorization.

17 Claims, 7 Drawing Sheets

METHOD AND APPARATUS FOR INITIATING A FUNDS TRANSFER USING A MOBILE DEVICE

BACKGROUND OF INVENTION

An electronic funds transfer or EFT refers to the computer-based systems used to perform financial transactions electronically. Merchants are increasingly relying upon EFTs to conduct business efficiently and safely. For instance, the Automated Clearing House Network (ACH), the electronic network for financial transactions in the United States, reported that more than 2.8 billion transactions were conducted in the fourth quarter of 2005, worth more than $6.3 trillion. More than 11,000 financial institutions and 585 organizations participate in the ACH network, and the system handles electronic payments in the areas of Internet commerce, electronic invoice presentment and payment, e-checks, financial electronic data interchange, international payments, and electronic benefits services.

Given the continued popularity of personal checks, many merchants would benefit from a system that would convert a check payment into an EFT. Electronic check clearing has many benefits over the traditional paper check, such as reduced processing costs and immediate notice of funds availability. Currently, however, additional equipment and expense is required to convert to a paper check payment into an electronic transaction. The need for additional equipment and the associated expenses is due, in part, to ACH regulations, which require that no financial institution may simply issue an ACH transaction towards an account without prior authorization from the account holder. Consequently, over 97% of field trades still accept paper checks.

Most consumers and merchants today carry one or more mobile computing devices (e.g., a mobile phone, personal digital assistant, a multimedia device, a compact computer, digital music player, and/or other portable electronic equipment) with them at all times. These mobile computing devices (often referred to as simply mobile devices) are capable of increasingly complex functions, including wireless communication, image and sound processing, and/or storage of data and images. The user interface(s) of most mobile devices can be modified to allow simple functions using both hard keys (e.g., a button that performs a static function, typically identified by symbol) and soft keys (e.g., a button, located alongside a display device, which performs a function dependent on the text shown near it at that moment on the display). The local memory capability of these devices allows users to access the Internet via a browser application and transmit electronic records relevant to all aspects of consumer life.

SUMMARY OF INVENTION

In general, in one aspect, the invention relates to a system for initiating an electronic funds transfer. The system comprises a first mobile device comprising functionality to display a notification of a sales transaction, obtain an authorization from the consumer to the electronic funds transfer based on the notification, instantiate a transfer entry form to obtain a transfer entry package, wherein the transfer entry package comprises the notification, a verification of the authorization, and consumer financial account information. The system further comprises a payment engine operatively connected to the first mobile device and comprising functionality to transmit the notification to the consumer of a sales transaction, generate the transfer entry form based on the authorization, and transmit the transfer entry package to a depository financial institution. The system further comprises a payment repository operatively connected to the payment engine and comprising functionality to store a record of the transfer entry package and the authorization.

In general, in one aspect, the invention relates to a method for initiating an electronic funds transfer. The method comprises transmitting a notification of terms for a sales transaction to a consumer, obtaining an authorization from the consumer for the electronic funds transfer, generating a transfer entry form based on the authorization, displaying the transfer entry form on a first mobile device, instantiating the transfer entry form using the first mobile device to obtain a transfer entry package, wherein the transfer entry package comprises the notification, a verification of the authorization, and consumer financial account information, transmitting the transfer entry package to a depository financial institution to initiate the electronic funds transfer, and storing a record of the authorization and the transfer entry package.

In general, in one aspect, the invention relates to a computer readable medium storing instructions for initiating an electronic funds transfer using a mobile device. The instructions comprising functionality for transmitting a notification of terms for a sales transaction to a consumer, obtaining an authorization from the consumer for the electronic funds transfer, generating a transfer entry form based on the authorization, displaying the transfer entry form on a first mobile device, instantiating the transfer entry form using the first mobile device to obtain a transfer entry package, wherein the transfer entry package comprises the notification, a verification of the authorization, and consumer financial account information, transmitting the transfer entry package to a depository financial institution to initiate the electronic funds transfer, and storing a record of the authorization and the transfer entry package.

Other aspects and advantages of the invention will be apparent from the following description and the appended claims.

DETAILED DESCRIPTION

Exemplary embodiments of the invention will be described with reference to the accompanying figures. Like items in the figures are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiments of the invention relate to initiating an electronic funds transfer using a mobile device. More specifically, one or more embodiments of the invention relate to providing notification to a consumer concerning a sales transaction, obtaining an authorization from the consumer for an electronic funds transfer for the sales transaction, generating a transfer entry form based on the authorization, displaying the transfer entry form on a mobile device, instantiating the transfer entry form using the mobile device to obtain a transfer entry package, transmitting the transfer entry package to a depository financial institution to initiate an electronic funds transfer, and storing a record of the authorization and the transfer entry package.

Figure 1:
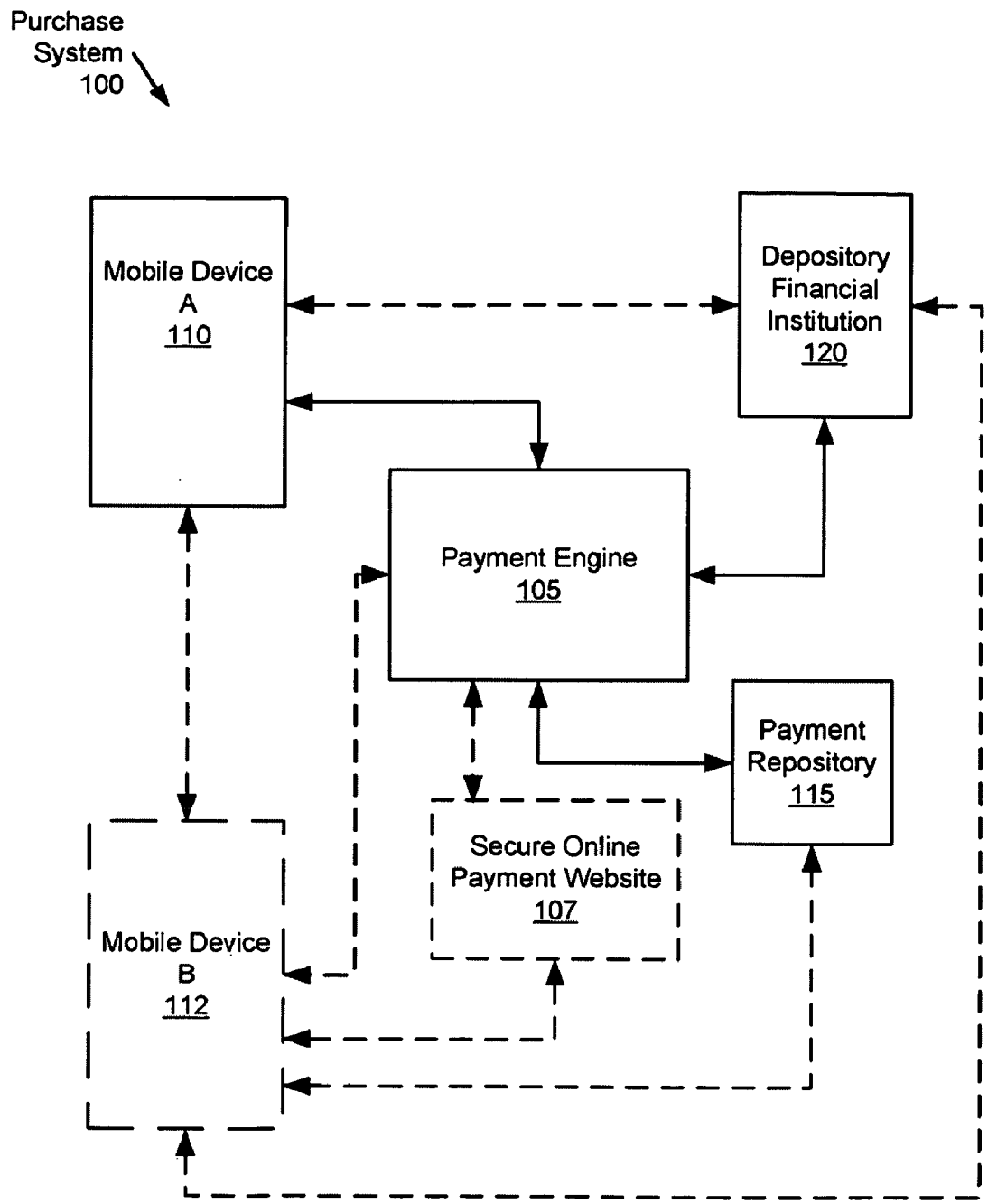
FIG. 1 shows a diagram of a payment system in accordance with one or more embodiments of the invention.

FIG. 1 shows a diagram of a payment system in accordance with one or more embodiments of the invention. As shown in FIG. 1, the payment system (100) includes one or more mobile devices (e.g., mobile device A (110) and/or mobile device B (112)), a payment engine (105), a payment repository (115), and a depository financial institution (120). Each is described below.

Figure 3:
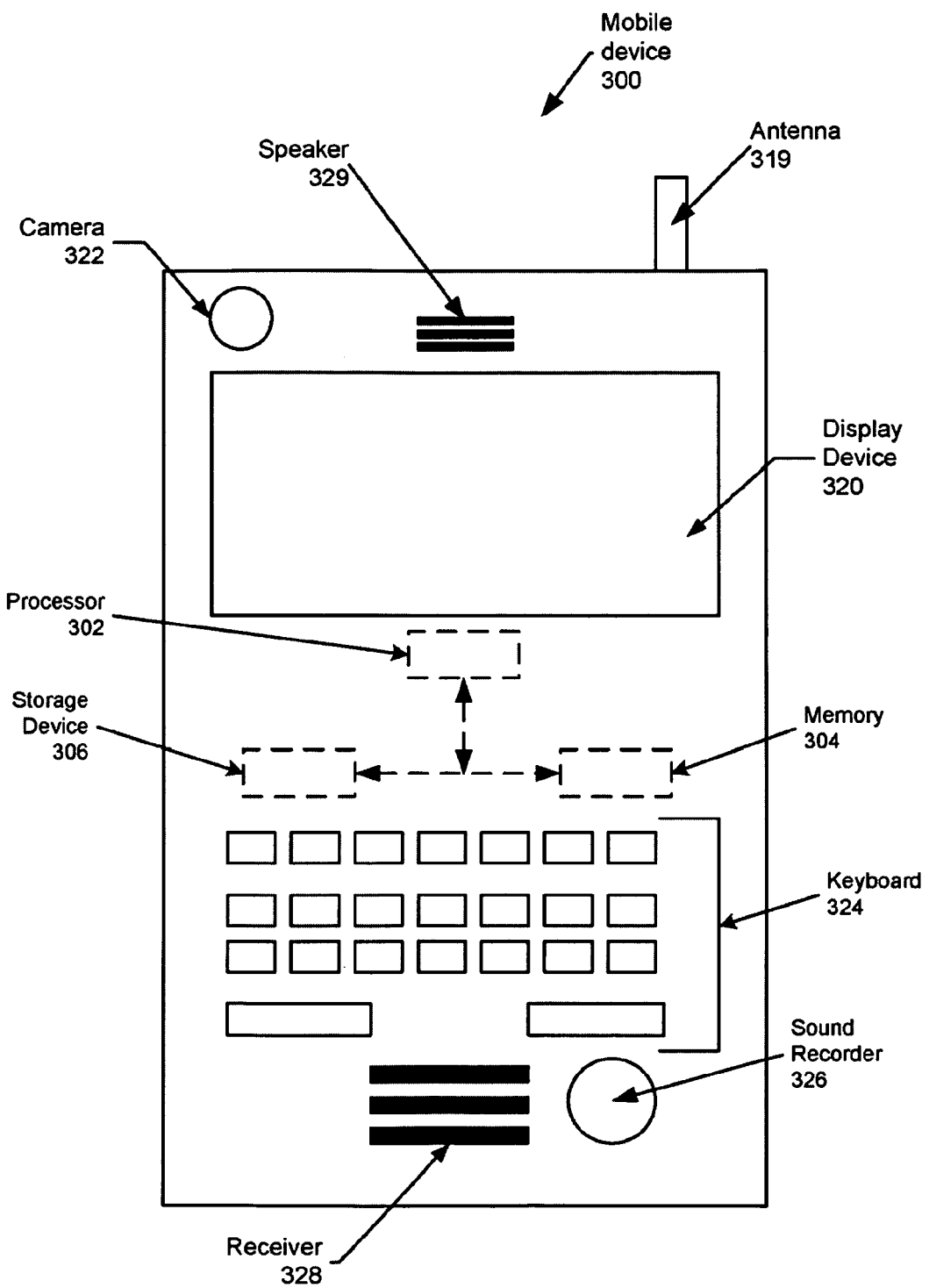
FIG. 3 shows a mobile device in accordance with one or more embodiments of the invention.

In one or more embodiments of the invention, the mobile device (e.g., mobile device A (110) and/or mobile device B (112)) is essentially the same as mobile device (300) described below and shown in FIG. 3. In essence, the mobile device e.g., mobile device A (110) and/or mobile device B (112)) is a computing device capable of completing an electronic funds transfer as part of a sales transaction. The mobile device (e.g., mobile device A (110) and/or mobile device B (112)) may be used by a merchant and/or a consumer, or someone authorized by the merchant and/or the consumer, to conduct the electronic funds transfer. The mobile device (e.g., mobile device A (110) and/or mobile device B (112)) includes functionality to display a transfer entry form, instantiate the transfer entry form to obtain a transfer entry package, and transmit the transfer entry package and an authorization (either directly or through the payment engine (105)) to a payment repository (115) and a depository financial institution (120).

The mobile device (e.g., mobile device A (110) and/or mobile device B (112)) may include further functionality to connect to a network (e.g., a local area network (LAN), a wide area network (WAN) such as the internet, a personal area network (PAN) such as Bluetooth, or any other similar type of network) via a network interface connection (not shown). In one or more embodiments of the invention, the mobile device (e.g., mobile device A (110) and/or mobile device B (112)) may include further functionality to exchange short text messages between mobile devices using such messaging protocols as Short Message Service (SMS), Multimedia Message Service (MMS), or other communication protocol. Those skilled in the art appreciate that these input and output means may take other forms not known or later developed.

In one or more embodiments of the invention, the network connection may be facilitated by a wireless infrastructure (not shown) including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device with a mobile device identifier of the mobile device.

In one or more embodiments of the invention, the mobile devices (e.g., mobile device A (110) and mobile device B (112)) may include further functionality to transmit data between mobile devices, for example using short-range wireless connectivity or a network connection. In one or more embodiments of the invention, the network connection may be facilitated by a hardwire connection. Both the input and output from the mobile device (e.g., mobile device A (110) and/or mobile device B (112)) may be displayed on the mobile device (e.g., mobile device A (110) and/or mobile device B (112)) and/or viewed by the merchant and/or the consumer for some period of time.

In one or more embodiments of the invention the notification, the transfer entry form, transfer entry package, and other information are displayed on a mobile device screen using a user interface (not shown), such as a graphical user interface (GUI). The user interface may be configured to allow entry of data using, for example, a data entry field(s), to display data received from a secure online payment website (107) or a payment engine (105) in a multitude of formats, such as graphics, text, digital images, etc. Further, a user interface may allow the consumer to receive notification of the terms of the sales transaction and/or modify the transfer entry form, for example, by entering the consumer bank account number from which funds will be transferred.

In one or more embodiments of the invention, the input is received using hard keys, such as the mobile device keyboard and soft keys displayed on a mobile device screen, such as touch keys. In one or more embodiments, the user interface may be configured to display a notification and to obtain an authorization, which may include, for example, a confirmation of receipt or an indication of acceptance. In one or more embodiments of the invention, some of the relevant information (e.g., bank account number and/or other identification) may be stored in the memory of the mobile device.

In one or more embodiments of the invention, the mobile device (e.g., mobile device A (110) and/or mobile device B (112)) may include a camera with functionality to generate a digital image. Examples of digital image may be a check executed by the consumer, the location of a transaction, the clerk assisting with a transaction, the website used for a transaction, or other images associated with the transaction.

In one or more embodiments of the invention, the mobile device (e.g., mobile device A (110) and/or mobile device B (112)) may include a receiver and speaker capable of transmitting audio data, such as live or recorded voices. In one or more embodiments of the invention, the mobile device (e.g. mobile device A (110) and/or mobile device B (112)) may include a voice recorder (326) capable of recording and transmitting, for example, the consumer's oral authorization.

Returning to FIG. 1, in one or more embodiments of the invention, the payment engine (105) is configured to transmit and receive information from the mobile device (e.g., mobile device A (110) and/or mobile device B (112)) (using a secured network or other means to limit accessibility to such information), including a notification, a transfer entry form, and a transfer entry package, and to transmit data to a depository financial institution (120) and a payment repository (115). Further, the payment engine (105) may be configured to accept input (e.g. from a mobile device, website server, depository financial institution and/or agent, computer, etc.) from the consumer, and/or any other interested party that provides information associated with the sales transaction and/or the electronic funds transfer. For example, in one or more embodiments of the invention, the payment engine (105) may be configured to provide notification to the consumer's mobile device using a text message (e.g., using SMS, MMS, and/or other messaging protocols.).

In one or more embodiments of the invention, the payment engine (105) is configured to send to the mobile device (e.g., mobile device A (110) and/or mobile device B (112)) a notification, and/or a transfer entry form containing a link to a secure online payment website (107), and to obtain information from the online payment website (107).

In one or more embodiments of the invention, all or a portion of the payment engine (105) resides on a server associated with the merchant. In one or more embodiments of the invention, all or a portion of the payment engine (105) resides on a third party server (not shown). For example, the third party server (not shown) may be associated with a bill-pay service, a financial institution, a credit card company, an internet financial service, or other similar payment service provider. In one or more embodiments of the invention, all or a portion of the payment engine (105) resides on the mobile device (e.g. mobile device A (110) and/or mobile device B (112)), or a server associated with the mobile device (e.g. mobile device A (110) and/or mobile device B (112)), or an associated communication service provider.

In one or more embodiments of the invention, the payment engine (105) interfaces with a payment repository (115) configured to store information. The payment repository (115) may be a relational database, a hierarchical (flat) file, or any other datastore well known in the art. In one or more embodiments of the invention, access to the payment repository (115) is restricted to protect the highly confidential information stored therein. Those skilled in the art will appreciate that elements stored in the payment repository (115) may be distributed and stored in multiple data repositories accessible across one or more networks, file systems, etc.

In one or more embodiments of the invention, all or a portion of the payment repository (115) resides on a server (not shown) associated with the payment engine (105). In one or more embodiments of the invention, all or a portion of the payment repository (115) resides on a server associated with the merchant. In one or more embodiments of the invention, all or a portion of the payment repository (115) resides on a third party server (not shown). For example, the third party server (not shown) may be associated with a bill-pay service, a financial institution, a credit card company, an internet financial service, or other similar payment service provider. In one or more embodiments of the invention, all or a portion of the payment repository (115) resides on the mobile device (e.g., mobile device A (110) and/or mobile device B (112)), or a server associated with the mobile or an associated communication service provider.

In one or more embodiments of the invention, the payment repository (115) is configured to store the authorization and transfer entry package. The payment repository (115) may also be configured to store sales transaction data associated with the electronic funds transfer, such as a transaction log, and/or act as a temporary holding account for the transferred funds. In this context, sales transaction data relates to any kind of information relevant to, or associated with, a consumer sales transaction. For example, sales transaction data could include consumer identification and contact information, merchant information, billing information (e.g., consumer bank account information, payment preference(s)), product or service information (e.g., product/service description, amount, cost), date, invoice number, mobile identifying data (e.g., phone number, MSISDN, location data), and other similar information.

In one or more embodiments of the invention, the depository financial institution (120) is configured to transmit and receive information from the payment engine (105) and/or the mobile device (e.g., mobile device A (110) and/or mobile device B (112)) (using a secured network or other means to limit accessibility to such information). The depository financial institution (120) may be a financial institution, or associated with a financial institution, that participates in an automated electronic funds transfer system, such as the Automated Clearing House (ACH) or the European Automated Clearing House (EACH), at the request of and by agreement with its customers. The depository financial institution (120) may be an Originating Depository Financial Institution (ODFI) or a Receiving Depository Financial Institution (RDFI), or a payment processing service associated with either. For example, in one or more embodiments of the invention, the merchant may transmit (either directly or through the payment engine (105)) the transfer entry package using mobile device A (110) to an ODFI which, in turn, forwards the entry to an automated clearing house Operator (not shown). In another embodiment of the invention, the consumer may transmit (either directly or through the payment engine (105)) the transfer entry package directly to the ODFI or the RDFI using, for example, mobile device B (112).

In one or more embodiments of the invention, the payment engine (105) interfaces with a secure online payment website (107). In one or more embodiments of the invention, the mobile device (e.g. mobile device B operated by the consumer) interacts directly with the secure online payment website (107). In one or more embodiments of the invention, all or a portion of the secure online payment website (107) resides on a server (not shown) associated with the payment engine (105). In one or more embodiments of the invention, all or a portion of secure online payment website (107) resides on a server associated with the merchant. In one or more embodiments of the invention, all or a portion of secure online payment website (107) resides on a third party server (not shown). In one or more embodiments of the invention, all or a portion of secure online payment website (107) resides on the mobile device (e.g., mobile device A (110) and/or mobile device B (112)), or a server associated with the mobile device (e.g., mobile device A (110) and/or mobile device B (112)) or an associated communication service provider.

Figure 2A:
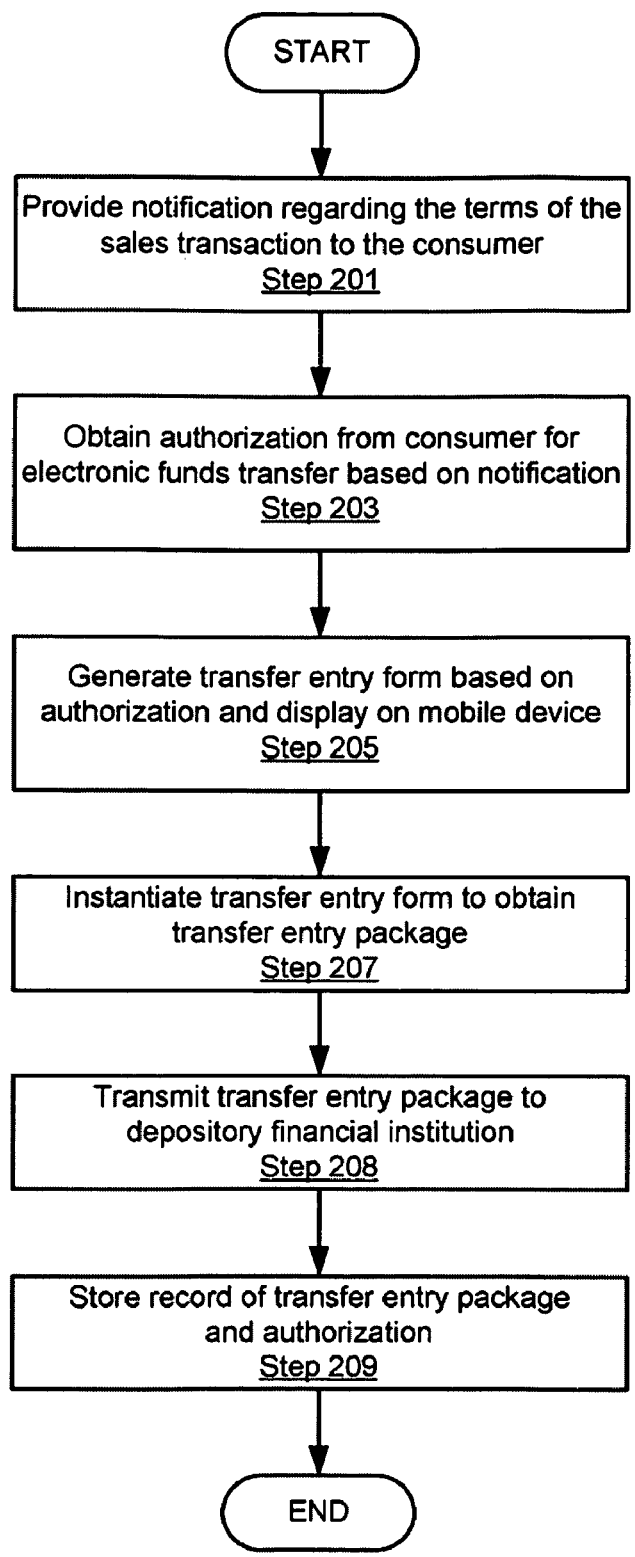
FIGS. 2A-2D show flow charts in accordance with one or more embodiments of the invention.

FIG. 2A shows a flow chart for initiating an electronic funds transfer using a mobile device in accordance with one or more embodiments of the invention. Those skilled in the art will recognize that certain steps may precede those shown in FIG. 2A. For example, the merchant may first present the consumer with an invoice for a sales transaction and the parties may contemplate the available methods of payment, the consumer may first enter into a contractual agreement with the merchant for the provision of goods or services, the consumer may have purchased goods or services from the merchant within the past two years, and/or the consumer may first register with a secure online payment site before providing an electronic authorization, as used in one or more embodiments of the invention.

In Step 201, the merchant provides notification to the consumer containing terms of a sales transaction for which payment may be made using an electronic funds transfer. The notification may take many forms, such as written, electronic, verbal, etc. In one embodiment of the invention, the merchant enters the transaction information and the bank routing and account number provided by the customer, for example provided orally by the consumer or taken from an executed paper check, into the mobile device. The merchant uses his or her mobile device to send a text message (e.g. via SMS, MMS, or e-mail) including the transaction information and requests authorization to obtain payment using an electronic funds transfer. In one or more embodiments of the invention, after entering the transaction and financial account information, the merchant obtains the consumer's oral authorization and sends the consumer an electronic mail notification. In one or more embodiments of the invention, the notification may be provided by SMS, and a reply via SMS indicated consumer authorization. In one or more embodiments of the invention, the notification may be oral, for example an operator or interactive voice response (IVR) system may contact the consumer using the merchant's and/or the consumer's mobile device.

In one or more embodiments of the invention, the information provided to the merchant is enriched using metadata from the merchant's and/or the consumer's mobile device, for example, using GPS coordinates, telephone number(s), financial account information, a mobile device identifier, a mobile device subscriber identity, etc. Those skilled in the art appreciate that enriched mobile data may take other forms now known or later developed.

Figure 2B:
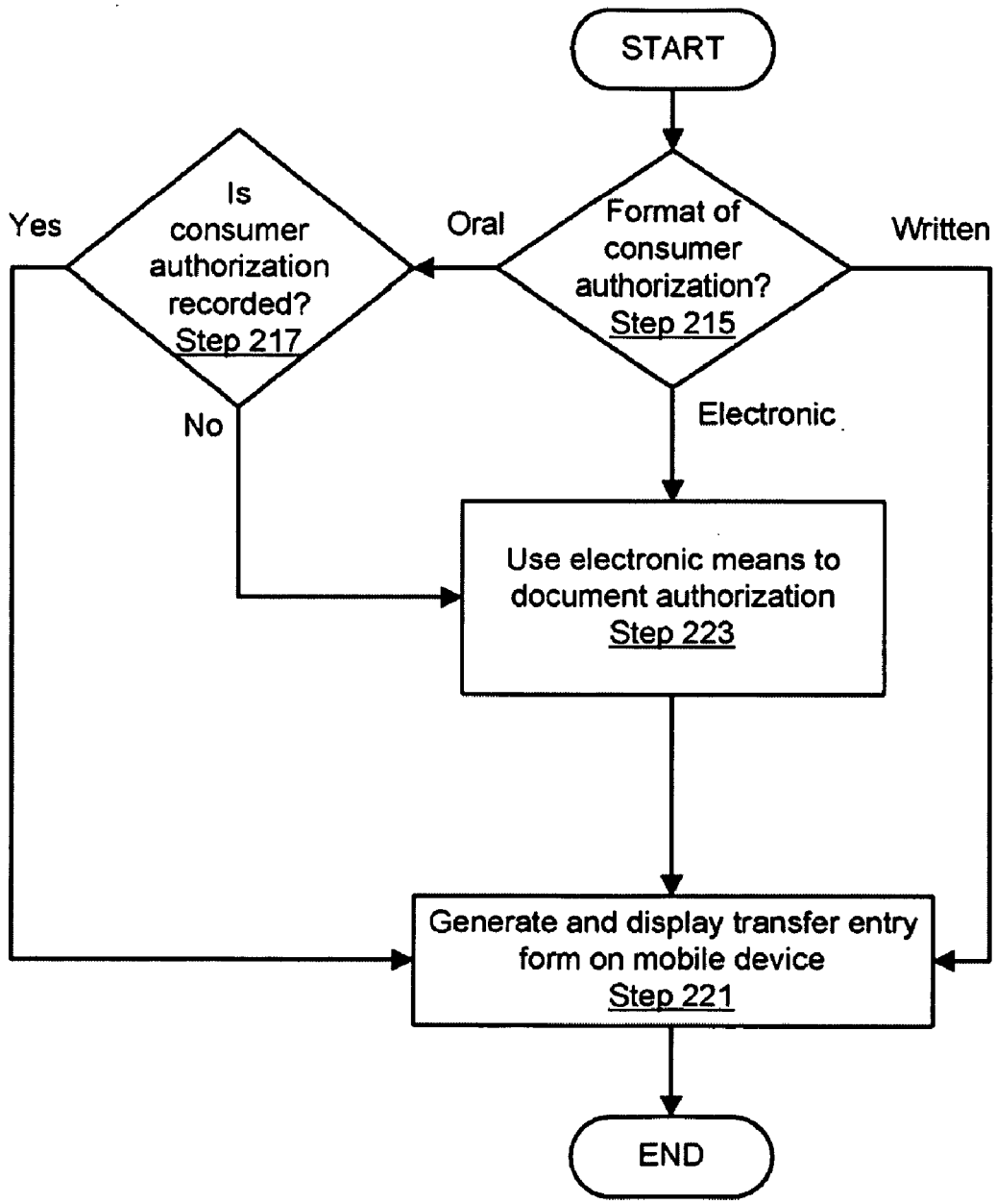

In Step 203, the merchant obtains an authorization from a consumer for an electronic funds transfer based on a sales transaction. The format of the authorization may vary. For example, FIG. 2B shows how to handle three different examples of authorizations: oral, written, and electronic. In the United States, ACH transactions are governed by National Automated Clearing House Association (NACHA) regulations and Regulation E. In accordance with the rules and regulations of ACH, no financial institution may simply issue an ACH transaction towards an account without prior authorization from the account holder. The steps that flow from each of these types of authorizations are intended only as examples of possible methods that comply with current NACHA regulations. Other regulations may apply in the event that new NACHA or federal regulations are promulgated, new or additional bodies are created to provide oversight in this area, or the geographic location of the sales transaction is outside the United States. Those skilled in the art will appreciate that these exemplary methods may take other forms now known or later developed in order to maintain compliance with applicable regulatory laws and guidelines.

In one or more embodiments of the invention, the authorization is provided in writing by the consumer (Step 215). For example, the written authorization may be a signed form giving consent on the amount, date, or frequency of the transaction. In one or more embodiments of the invention, the consumer executes a check based on the notification and the information provided on the check may be used to complete the transfer entry form. For example, a digital image of the check may be generated using the camera functionality of a mobile device, and data may be taken from the check to obtain an authorization and transfer entry package (either manually by the merchant or the system may use software, such as optical character recognition (OCR), or magnetic ink character recognition (MICR) technology, to read the information contained thereon). The data may include the consumer's name, address, payee name, amount of sales transaction, date, bank account information, and/or other information necessary to complete the transaction. This information may then optionally be used to generate and display the transfer entry form on a mobile device (Step 221), as also shown as Step 205 of FIG. 2A.

The authorization may be provided orally by the consumer (Step 215) in accordance with one or more embodiments of the invention. For example, the oral authorization may comprise an authorization to an ACH debit to his/her account and express the terms of the authorization in a clear manner, including the date on or after which the consumer's account will be debited, the amount of the debit entry, the consumer's name and contact information, and the date of the oral authorization. In one or more embodiments of the invention, the merchant may record the oral authorization (Step 217). In one or more embodiments of the invention, the mobile device may be used to generate a digital recording of the oral authorization. For example, the merchant may use the mobile device to generate and store a digital recording, or use the voice transmission capabilities of the mobile device to transmit the oral authorization to a receiving device (e.g. the payment engine and/or payment repository) capable of creating and/or storing the record. This information may then be used to generate and display the transfer entry form on a mobile device (Step 221), as also shown as Step 205 of FIG. 2A.

Continuing with FIG. 2B, if the oral authorization is not recorded, it may be provided by the consumer electronically (Step 223) in accordance with one or more embodiments of the invention. For example, the authorization may be documented using an electronic mail (e-mail), text message, a secure online payment website, or other electronic means. This information may then optionally be used to generate and display the transfer entry form on a mobile device (Step 221), as also shown as Step 205 of FIG. 2A.

Returning to FIG. 2A, Step 205, a transfer entry form is generated and displayed on the mobile device (as described above as Step 221 in FIG. 2B). Next, the consumer or the merchant may use the mobile device to instantiate the transfer entry form to create a transfer entry package (Step 207). For example, the consumer may provide his/her name, ID number and/or security code(s), date, amount of transferred funds authorized, mailing address, name and account information for the financial institution to which transfer entry may be presented, an accredited bill payment access code number, and any other information necessary to facilitate payment based on the sales transaction. In one or more embodiments of the invention, the transfer entry form may be partially or totally instantiated, and this information used to generate the notification regarding the terms of the sales transaction to the consumer.

This mobile electronic funds transfer payment system allows for numerous and interchangeable means and steps to provide notification, instantiate the transfer entry form, and obtain authorization from the consumer. For example, FIG. 2C shows a flow chart of several options for providing notification and obtaining authorization from the consumer.

Figure 2C:
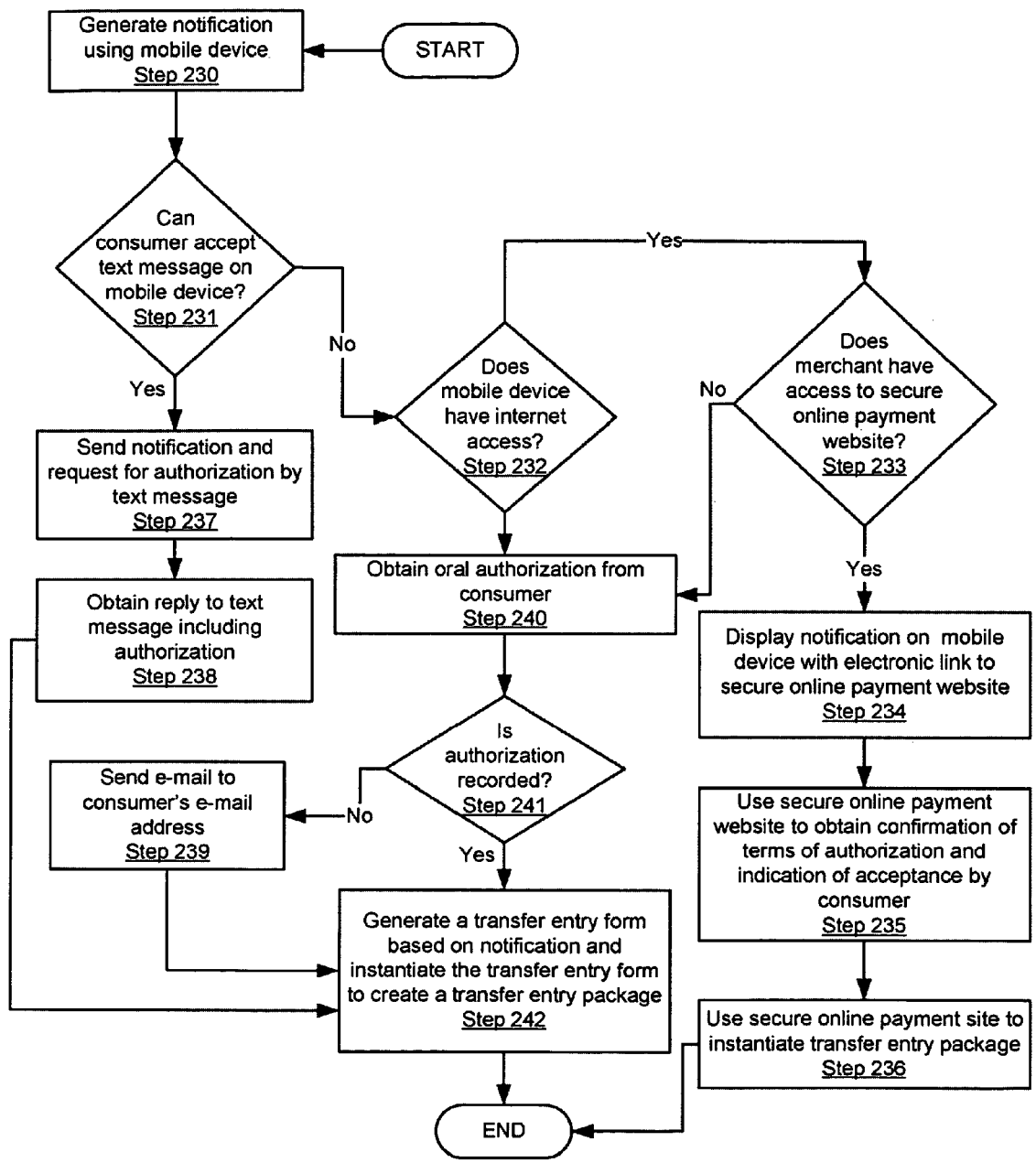

Turning to FIG. 2C, for the text messaging option, the merchant generates a notification (Step 230) using a mobile device (e.g. the merchant's mobile device), and (if the consumer can accept a text message on the mobile device (Step 231)) the notification is transmitted as a text message (e.g., SMS, MMS, etc.) to another mobile device (e.g. the consumer's mobile device) (Step 237) along with a request for authorization of the electronic funds transfer in accordance with one or more embodiments of the invention. The consumer authorizes the transaction by replying to the text message (Step 238). Finally, the transfer entry form is generated based on the notification and the transfer entry form is instantiated to create a transfer entry package (Step 242), as also shown as Step 207 of FIG. 2A.

Continuing with FIG. 2C, for the oral authorization option, the merchant generates a notification (Step 230) using a mobile device (e.g. the merchant's mobile device), and (if the mobile device has internet access (Step 232)) the merchant obtains the oral authorization from the consumer (Step 240) and (if the authorization is not recorded (Step 241)) sends an e-mail notification to the consumer's e-mail address (Step 239) before generating the transfer entry form based on the notification and instantiating the transfer entry form to create a transfer entry package (Step 242), as also shown as Step 207 of FIG. 2A. Otherwise, the transfer entry form is generated and instantiated to create a transfer entry package (Step 242), as also shown as Step 207 of FIG. 2A, without the need for the additional e-mail to the consumer.

Continuing with FIG. 2C, for the online payment website option, the merchant (if the merchant has access to a secure online payment website (Step 233)) may provide information concerning the transaction electronically (Step 234) and obtain an electronic authorization from the consumer (Step 235). For example, the information may be part of an electronic notification or transfer entry form. In one or more embodiments of the invention, the notification is displayed with an electronic link to a secure online payment site allowing the consumer to provide an electronic authorization. For example, the secure online payment website may include a confirmation of terms of the authorization and an "I agree" box indicating acceptance by the consumer. In one or more embodiments of the invention, the consumer (directly or with the assistance of the merchant) may use the secure online payment site to instantiate the transfer entry form (Step 236), as also shown as Step 207 of FIG. 2A.

Figure 2D:
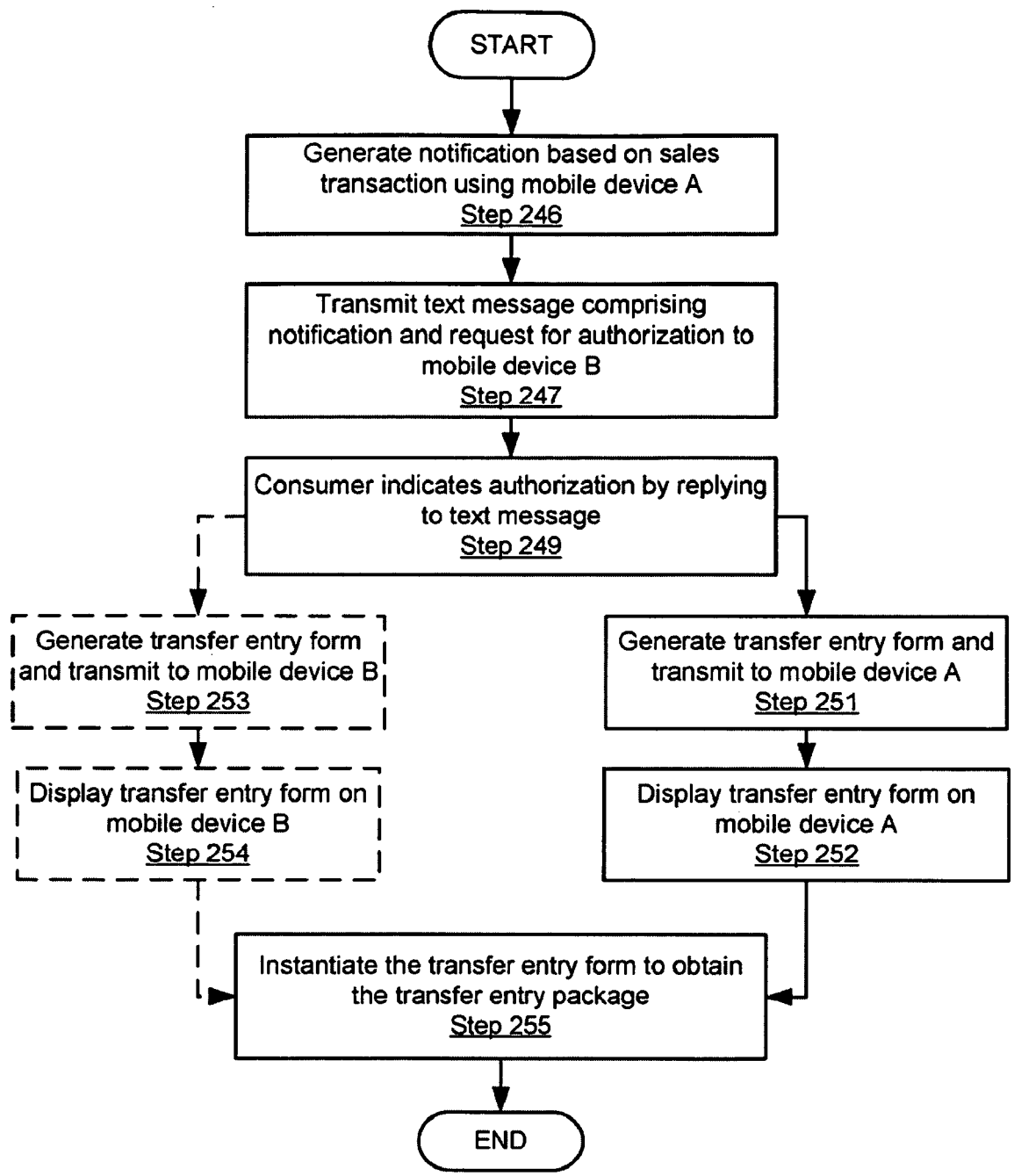

In one or more embodiments of the invention, the notification and/or the transfer entry form may be transmitted to and displayed on a second mobile device. For example, FIG. 2D shows, the notification is generated based on a sales transaction and the text message is sent directly from mobile device A (e.g. the merchant's mobile device) (Step 246) in accordance with one or more embodiments of the invention. In one or more embodiments of the invention, the notification and transfer entry form is sent by text message to mobile device B (e.g. the mobile device of the consumer) (Step 247). In one or more embodiments of the invention, the text message may be sent from another source, for example the payment engine or a third party service (not shown).

In one or more embodiments of the invention, the consumer indicates authorization by replying to the text message (Step 249). The transfer entry form may be generated and transmitted to mobile device A (Step 251). Next, the transfer entry may be displayed (Step 252) on mobile device A. Alternatively or in combination, the transfer entry form may be generated and transmitted to mobile device B (Step 253). Next, the transfer entry may be displayed (Step 254) on mobile device B. Finally, the transfer entry form is instantiated to obtain the transfer entry package (Step 255), as also shown as Step 207 of FIG. 2A.

Returning to FIG. 2A, Step 208 shows the mobile device transmitting (directly or through the payment engine) the transfer entry package to a depository financial institution for processing. For example, the depository financial institution may be an ODFI that does ACH origination, and the ODFI forwards the transfer entry package to an ACH Operator for further transmission to a RDFI, which will issue a debit to the consumer's account.

In one or more embodiments of the invention, a first mobile device may be communicate with a second mobile device (e.g. using SMS, near field communication, Bluetooth, etc.), and the consumer may transmit the authorization and/or the transfer entry package to the first mobile device. In one or more embodiments of the invention, the second mobile device may transmit the authorization and/or the transfer entry package (directly or through the payment engine) to the depository financial institution (e.g. the ODFI and/or the RDFI). In one or more embodiments of the invention, the second mobile device may transmit the authorization and/or the transfer entry package using a secure online payment website.

Returning again to FIG. 2A, Step 209 shows storing a record of the transfer entry package and authorization. Storage of the record may be for a short duration or the record may persist for a long period of time. Further, the storage of the record may be used for audit, verification, compliance, and/or archival purposes. The format of the authorization and type of record may vary depending upon the method used to obtain it, examples of which have been provided above.

Embodiments of the invention may be implemented on virtually any type of mobile device regardless of the platform being used. In one or more embodiments of the invention, the mobile device (300) includes any portable device that provides a user interface. Examples of mobile devices may include, but are not limited to, cellular phones, personal digital assistants, personal communicators, pagers, smart phones, or any other computing device. For example, as shown in FIG. 3, a mobile device (300), which is essentially the same as the mobile devices (e.g., mobile device A (110) and mobile device B (112)) shown in FIG. 1, includes a processor (302), memory (304), a storage device (306), a speaker (329), a receiver (328), a keyboard (324), a sound recorder (326), a display device (320), a camera (322), and an antenna (319).

The mobile device (300) includes one or more processor(s) (302), associated memory (304) (e.g., random access memory (RAM), cache memory, flash memory, etc.), a storage device (306) (e.g., a hard disk, an optical drive such as a compact disk drive or digital video disk (DVD) drive, a flash memory stick, etc.), and numerous other elements and functionalities typical of today's mobile devices (not shown). The mobile device (300) may include input means and output means, such as the keyboard (324), the receiver (328), and/or the display device (e.g., a liquid crystal display screen) (320), which permits a user to enter and/or display keystrokes including numeric, alphabetic, and other characters, images, or other media types. Other input devices may include a camera (322), a sound recorder (326), and/or other data recording mechanism. Those skilled in the art will appreciate that these input and output means may take other forms now known or later developed. Using embodiments of the present invention, a consumer may initiate an electronic funds transfer using the mobile device (300).

The mobile device (300) may be connected to a network (e.g., a local area network (LAN), a wide area network (WAN) such as the Internet, or any other similar type of network) via the antenna (319) or other network interface connection(s) (not shown). In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device (300) with a mobile device identifier of the mobile device (300).

In one or more embodiments of the invention, the network connection may be facilitated by a hardwired or other similar connection. For example, the network connection may involve a hardwire connection or short-range wireless connectivity technology with a second mobile device, a printing mechanism, a scanner, or a recording system.

Figure 4:
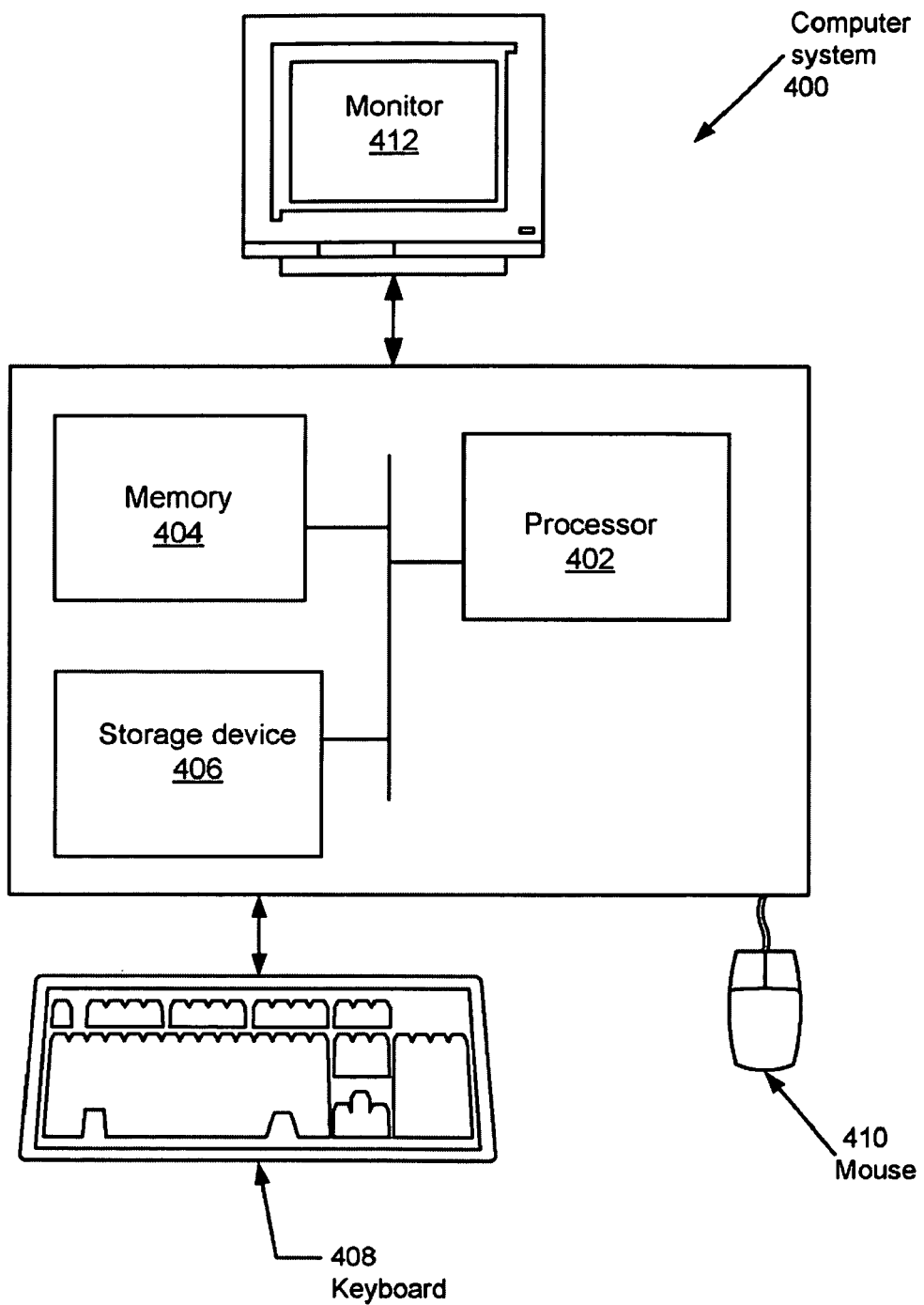
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system may also be a mobile device, such as those described in association with FIG. 3. The computer system (400) may be connected to a network (414) (e.g., a local area network (LAN), a wide area network (WAN) such as the Internet, or any other similar type of network) via a network interface connection. In one or more embodiments of the invention, the network connection may be facilitated by a wireless infrastructure (not shown), including one or more transceivers cooperating to facilitate wireless communications to wireless devices. Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., payment engine, user interface, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention h as been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A system to initiate an electronic funds transfer, comprising:
a first mobile device of a consumer conducting a sales transaction, comprising functionality to:
display a notification of the sales transaction requesting payment by the electronic funds transfer using an automated clearing house (ACH) transaction,
obtain, in response to the notification and prior to submitting the payment of the sales transaction by the consumer, a digital image of an executed check executed by the consumer to complete a transfer entry form of the ACH transaction, wherein the ACH transaction comprises debiting a pre-existing financial account controlled by the consumer at a depository financial institution, wherein the executed check is not submitted for the sales transaction, and
submit, in response to obtaining the digital image, the payment of the sales transaction by:
extracting check data from the digital image, wherein the check data comprises a signature of the consumer and consumer financial account information of the pre-existing financial account,
obtaining an authorization from the consumer for authorizing the depository financial institution to issue the ACH transaction, wherein the authorization is based on the signature of the consumer extracted from the digital image, and
instantiating the transfer entry form to obtain a transfer entry package, wherein the transfer entry package comprises the notification, a verification of the authorization, and the consumer financial account information;
a payment engine operatively connected to the first mobile device and comprising functionality to:
transmit the notification to the first mobile device, and
transmit the transfer entry package to the depository financial institution to initiate the electronic funds transfer using the ACH transaction; and
a payment repository operatively connected to the payment engine and comprising functionality to store a record of the transfer entry package and the authorization.

2. The system of claim 1, wherein the notification comprises one from the group consisting of a short message service (SMS) message, an electronic mail, an instant message, a video message, an audio message, a webpage text, a multimedia messaging service (MMS) message, an oral statement, a short-range wireless transmission, and a wireless network communication.

3. The system of claim 1, wherein the payment engine further comprises functionality to:
obtain the authorization by the consumer from the first mobile device, and
generate the transfer entry form based on the authorization for sending to the first mobile device.

4. The system of claim 3, wherein the notification further comprises:
an electronic link to a secure online payment website communicatively connected to the first mobile device and the payment engine and comprising functionality to:
obtain the authorization by the consumer from the first mobile device, and
generate the transfer entry package for sending to the payment engine.

5. The system of claim 3, wherein the authorization comprises a text message.

6. The system of claim 1, wherein the first mobile device comprises further functionality to:
generate the digital image using camera functionality of the first mobile device.

7. The system of claim 1, further comprising:
a second mobile device of a merchant of the sales transaction, wherein the second mobile device comprises at least a portion of the payment engine.

8. The system of claim 7, wherein the second mobile device comprises functionality to generate the notification for sending to the first mobile device via a text message.

9. A method to initiate an electronic funds transfer, comprising:
transmitting a notification of a sales transaction requesting payment using an automated clearing house (ACH) transaction to a consumer;
obtaining, in response to the notification, prior to submitting the payment of the sales transaction by the consumer, and using a first mobile device of the consumer, a digital image of an executed check executed by the consumer to complete a transfer entry form of the ACH transaction, wherein the ACH transaction comprises debiting a pre-existing financial account controlled by the consumer at a depository financial institution, wherein the executed check is not submitted for the sales transaction;

submitting, in response to obtaining the digital image, the payment of the sales transaction by:
extracting, using the first mobile device, check data from the digital image, wherein the check data comprises a signature of the consumer and consumer financial account information of the pre-existing financial account;
obtaining an authorization from the consumer for authorizing the depository financial institution to issue the ACH transaction, wherein the authorization is based on the signature of the consumer extracted from the digital image;
instantiating the transfer entry form using the first mobile device to obtain a transfer entry package, wherein the transfer entry package comprises the notification, a verification of the authorization, and the consumer financial account information; and
transmitting the transfer entry package to the depository financial institution to initiate the electronic funds transfer using the ACH transaction; and
storing a record of the authorization and the transfer entry package.

10. The method of claim 9, wherein the notification comprises one from the group consisting of a short message service (SMS) message, an electronic mail, an instant message, a video message, an audio message, a webpage text, a multimedia messaging service (MMS) message, a short-range wireless transmission, and a wireless network transmission.

11. The method of claim 9, wherein the authorization is provided electronically by the consumer using the first mobile device.

12. The method of claim 11, wherein the authorization comprises a text message.

13. The method of claim 9, wherein the transfer entry form further comprises an electronic link to a secure online payment website,
wherein the secure online website is displayed on the first mobile device, and
wherein the secure online website is used to obtain the authorization and generate the transfer entry package.

14. The method of claim 9, further comprising:
using camera functionality of the first mobile device to generate the digital image.

15. The method of claim 9, wherein the notification is sent from a merchant of the sales transaction using a second mobile device of the merchant.

16. The method of claim 15, wherein at least one selected from a group consisting of obtaining the authorization, generating the transfer entry form, and transmitting the transfer entry package is by using the second mobile device.

17. A non-transitory computer readable medium storing instructions to initiate an electronic funds transfer, the instructions comprising functionality to:
transmit a notification of a sales transaction requesting payment using an automated clearing house (ACH) transaction to a consumer;
obtain, in response to the notification, prior to submitting the payment of the sales transaction by the consumer, and using a first mobile device of the consumer, a digital image of an executed check executed by the consumer to complete a transfer entry form of the ACH transaction, wherein the ACH transaction comprises debiting a pre-existing financial account controlled by the consumer at a depository financial institution, wherein the executed check is not submitted for the sales transaction;
submit, in response to obtaining the digital image, the payment of the sales transaction by:
extracting, using the first mobile device, check data from the digital image, wherein the check data comprises a signature of the consumer and consumer financial account information of the pre-existing financial account,
obtaining an authorization from the consumer for authorizing the depository financial institution to issue the ACH transaction, wherein the authorization is based on the signature of the consumer extracted from the digital image, and
instantiating the transfer entry form using the first mobile device to obtain a transfer entry package, wherein the transfer entry package comprises the notification, a verification of the authorization, and the consumer financial account information;
transmit the transfer entry package to the depository financial institution to initiate the electronic funds transfer using the ACH transaction; and
store a record of the authorization and the transfer entry package.

* * * * *